(12) United States Patent
Shimizu et al.

(10) Patent No.: US 7,740,120 B2
(45) Date of Patent: Jun. 22, 2010

(54) MONEY PROCESSING SYSTEM

(75) Inventors: Kazuyuki Shimizu, Himeji (JP);
Hajime Murota, Himeji (JP); Kazuya Itou, Himeji (JP); Masashi Numaki, Himeji (JP); Koichi Nishida, Himeji (JP)

(73) Assignee: Glory Kogyo Kabushiki Kaisha, Hyogo-ken (JP)

( * ) Notice: Subject to any disclaimer, the term of this patent is extended or adjusted under 35 U.S.C. 154(b) by 1595 days.

(21) Appl. No.: 11/006,701

(22) Filed: Dec. 8, 2004

(65) Prior Publication Data

US 2005/0256792 A1    Nov. 17, 2005

(51) Int. Cl.
*G07D 7/00* (2006.01)
*G07D 11/00* (2006.01)

(52) U.S. Cl. ..................................... 194/302
(58) Field of Classification Search .................. 194/302
See application file for complete search history.

(56) References Cited

U.S. PATENT DOCUMENTS

| | | | | |
|---|---|---|---|---|
| 4,150,740 A | * | 4/1979 | Douno | 194/206 |
| 4,953,086 A | * | 8/1990 | Fukatsu | 705/42 |
| 6,045,443 A | * | 4/2000 | Weston et al. | 453/17 |
| 6,715,670 B1 | * | 4/2004 | Swiatek et al. | 235/379 |

FOREIGN PATENT DOCUMENTS

| | | |
|---|---|---|
| JP | 03-177990 A | 8/1991 |
| JP | 6-176238 | 6/1994 |
| JP | 08-329339 A | 12/1996 |
| JP | 2000-61125 | 2/2000 |
| JP | 2000-194898 A | 7/2000 |

OTHER PUBLICATIONS

Japanese Office Action mailed Jun. 16, 2009 for a corresponding application JP2003-165177 (w/English translation).
Japanese Office Action with English language translation issued in corresponding Japanese Application No. 2003-165177 dated Feb. 27, 2009.

* cited by examiner

*Primary Examiner*—Patrick Mackey
*Assistant Examiner*—Mark Beauchaine
(74) *Attorney, Agent, or Firm*—Smith, Gambrell & Russell, LLP

(57) ABSTRACT

A money processing system according to the present invention includes a coin change dispenser, a note change dispenser, and a control terminal, each having a control unit. The control units are generally adapted to carrying out a "change dispensing mode" control for receiving money given by a customer and dispensing change as occasion demands, and is adapted to carrying out a "money exchange mode" control, when a money exchange instruction is given from instruction means. In the money exchange mode, (a) when a single piece of money is received, a normal money exchange process for dispensing a combination of exchanged money each having a denomination smaller than that of the received money is executed such that a sum total of the combination of the exchanged money is equivalent to the received money, and (b) when a plurality of pieces of money are received, a reverse money exchange process for dispensing a combination of (the minimum number of pieces of) exchanged money each having a denomination larger than that of the received money is executed such that a sum total of the combination of the exchanged money is equivalent to the received money.

4 Claims, 2 Drawing Sheets

MONEY PROCESSING SYSTEM

BACKGROUND OF THE INVENTION

1. Field of the Invention

The present invention relates to a money processing system which can execute a money exchange process.

2. Background Art

A conventional money processing system capable of executing a money exchange process has been disclosed in, for example, Japanese Patent Laid-Open Publication No. 176238/1994. The system disclosed therein is an automatic cash processing apparatus serving not only as a change dispenser, but also as a money exchange machine, by selecting a money exchange mode. However, Japanese Patent Laid-Open Publication No. 176238/1994 does not disclose a so-called reverse money exchange process executed in the exchange mode. The reverse money exchange process is a process that is opposite to a general money exchange process ("normal money exchange process").

Herein, the "normal money exchange process" means a process in which a combination of coins or notes each of whose denomination is smaller than the money deposited from the outside is dispensed, such that a sum total of the combination of the dispensed coins or notes is equivalent to the deposited money. For example, when a 1,000-yen note (received money) is deposited from the outside, ten 100-yen coins (exchanged money) are dispensed. On the other hand, the "reverse money exchange process" means a process in which a combination of coins or notes each of whose denomination is larger than the money deposited from the outside is dispensed, such that a sum total the combination of the dispensed money is equivalent to the deposited money. For example, when ten 100-yen coins (received money) are deposited from the outside, two 500-yen coins (exchanged money) are dispensed.

It is known that a money processing system exclusively used for a money exchange can execute a reverse money exchange process by selecting a reverse exchange mode by means of, e.g., an operation switch.

The above-described conventional money processing system has the following disadvantages. That is, in a system where the reverse money exchange process is carried out by selecting a reverse exchange mode, a constitution of the system is necessarily complicated, and a cost for the system is inevitably increased. The system can be improved in its user-friendliness. In particular, in a money processing system which is not exclusively used as a money exchange machine, that is, in the money processing system serving both as a change dispenser and a money exchange machine, it is difficult to simplify a constitution of the system or reduce the cost therefor. Further, an operation system of such a system is relatively complicated, which aggravates the problems.

SUMMARY OF THE INVENTION

The present invention is made in view of the above difficulties. An object of the present invention is to provide a money processing system for executing both a normal money exchange process and a reverse money exchange process, while achieving a simplified constitution of the system, a decreased cost for the system, and an improvement in a user-friendliness of the system.

In order to accomplish the object, there is provided a money processing system, comprising:

a money receiving part for receiving money;

a money identifying unit for identifying a denomination of the money received by the money receiving part;

a money storage part for storing the received money, depending on a denomination thereof identified by the money identifying unit;

a money dispensing part for dispensing the money stored in the money storage part; and a control unit for carrying out a procedure in which the money stored in the money storage part is picked out in accordance with a given dispensing condition, and the picked-out money is dispensed from the money dispensing part; wherein the control unit is adapted to execute:

(a) when a single piece of money is received, a normal money exchange process for dispensing a combination of exchanged money each having a denomination smaller than that of the received money, such that a sum total of the combination of the exchanged money is equivalent to the received money; or (b) when a plurality of pieces of money are received, a reverse money exchange process for dispensing a combination of exchanged money each having a denomination larger than that of the received money, such that a sum total of the combination of the exchanged money is equivalent to the received money.

According to the money processing system, the normal money exchange process and the reverse money exchange process can be automatically selected, in accordance with the number of pieces of the received money, without selecting a normal/reverse exchange mode. Therefore, in the money processing system for executing both the normal money exchange process and the reverse money exchange process, a constitution of the system can be simplified, which results in a reduced cost for the system, and an improvement in a user-friendliness of the system.

It is preferable that the control unit is adapted to dispense a combination of the minimum number of pieces of the exchanged money in the (b) reverse money exchange process. Thus, the money processing system can provide a rapid reverse money exchange process, which is convenient for a majority of users.

It is preferable that the system further comprises instruction means for giving a money exchange instruction to the control unit, and the control unit is generally adapted to carrying out a change dispensing mode control for receiving money given by a customer and dispensing change as occasion demands, and is adapted to carrying out a money exchange mode control for executing either the (a) normal money exchange process or the (b) reverse money exchange process, when the money exchange instruction is given from the instruction means. Thus, the money processing system can be configured as a change dispenser which is capable of carrying out the above money exchange process. Accordingly, in a money processing system in which the change dispenser executes a money exchange process, problems involved in carrying out the normal and the reverse money exchange process can be solved. That is, a complicated constitution of the system, an increased cost for the system, and an inconvenience for a user can be alleviated or eliminated.

DETAILED DESCRIPTION OF THE INVENTION

Figure 1:
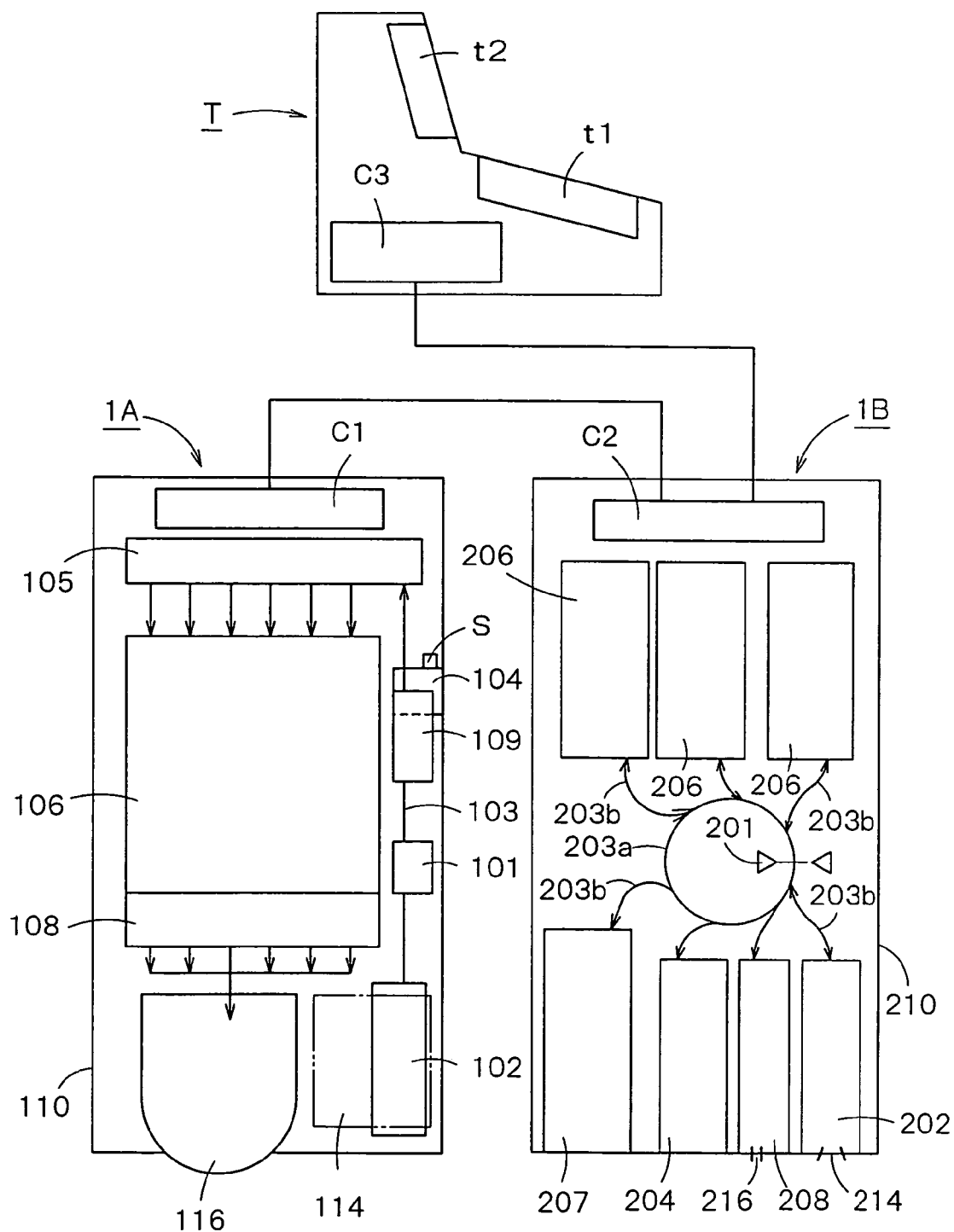
FIG. 1 is a block diagram showing a money receiving/dispensing system in an embodiment of a money processing system according to the present invention.
Figure 2:
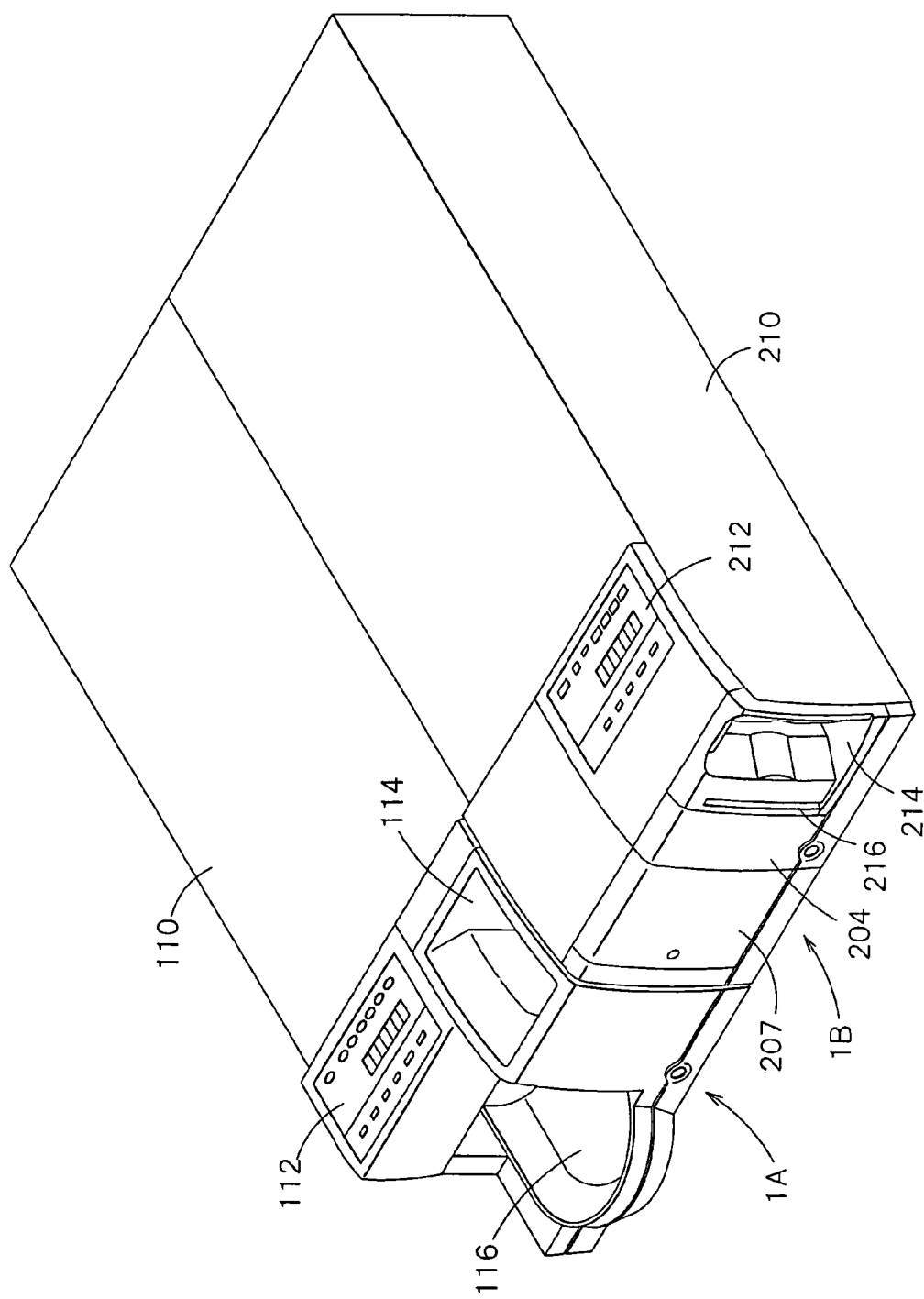
FIG. 2 is a perspective view of a coin change dispenser and a note change dispenser in the money processing system shown in FIG. 1.

An embodiment of the present invention will be described below with reference to the accompanied drawings. FIGS. 1 and 2 are views showing an embodiment of a money processing system according to the present invention. Hereinafter, a constitution, an operation, an effect, and alternative examples of the present invention are described in this order.

[Constitution]

(1) General Constitution

FIG. 1 shows a money receiving/dispensing (depositing/paying) system in an embodiment of a money processing system according to the present invention, which is operated by an operator such as a clerk. The money receiving/dispensing system is formed of a combination of a coin change dispenser 1A, a note change dispenser 1B, and a control terminal T.

The coin change dispenser 1A and the note change dispenser 1B are respectively provided with a control unit C1 and a control unit C2 which are connected to each other. The control terminal T is configured as, for example, a POS register (a cash register having a point of sales function). The control terminal T includes an operation part t1, a display part t2, and a control unit C3 connected to the control unit C2 of the note change dispenser 1B.

Each of the coin change dispenser 1A and the note change dispenser 1B includes:
- a money receiving part (a coin receiving port 114 and a note receiving slot 214) for receiving money (coins and notes);
- a money identifying unit (a coin identifying sensor 101 and a note identifying sensor 201) for identifying a denomination of the money received by the money receiving part;
- a money storage part (a coin storage part 106 and note storage parts 206) for storing therein the received money, depending on a denomination thereof identified by the money identifying unit; and
- a money dispensing part (a coin dispensing port 116 and a note dispensing slot 216) for dispensing the money stored in the money storage part.

The control units C1 to C3 of the money processing system carry out a procedure in which the money stored in the coin storage part 106 and the note storage part 216 is picked out in accordance with a given "dispensing condition", and the picked-out money is dispensed through the coin receiving port 116 and the note dispensing slot 216 (money dispensing part).

The money processing system according to the present invention includes instruction means for giving a money exchange instruction to at least one of the control units C1 to C3. The instruction means may be configured as an operation button disposed on, for example, at least one of an operation/display part 112 (FIG. 2) of the coin change dispenser 1A, an operation/display part 212 (FIG. 2) of the note change dispenser 1B, and the operation part t1 of the control terminal T.

The control units C1 to C3 of the money processing system are generally adapted to carrying out a "change dispensing mode" control for receiving money given by a customer and dispensing change as occasion demands. When the money exchange instruction is given from the instruction means, the control units C1 to C3 are adapted to carrying out a "money exchange mode" control for executing either (a) normal money exchange process or (b) reverse money exchange process, which are described below.

(a) Normal Money Exchange Process:

When a single piece of money is received, a combination of exchanged money each having a denomination smaller than that of the received money is dispensed, such that a sum total of the combination of the exchanged money is equivalent to the received money.

(b) Reverse Money Exchange Process:

When a plurality of pieces of money are received, a combination of (the minimum number of pieces of) exchanged money each having a denomination larger than that of the received money is dispensed, such that a sum total of the combination of the exchanged money is equivalent to the received money.

That is, the "dispensing condition" is given when, for example, an instruction for dispensing change is given from the control terminal T, or when the change dispensers 1A and 1B should dispense exchanged coin(s) or note(s) corresponding to received coin(s) or note(s).

Constitutions of the coin change dispenser 1A and the note change dispenser 1B will be described in detail below.

(2) Coin Change Dispenser

As shown in FIGS. 1 and 2, the coin change dispenser 1A is provided with a housing 110 which has, on a front part of its upper surface, the operation/display part 112 (FIG. 2). The coin receiving port 114 and the coin dispensing port 116 are formed on the front part of the housing 110.

As shown in FIG. 1, the coin change dispenser 1A has a coin introducing mechanism 102 for introducing therein coins received in the coin receiving port 114 in a non-stacked, single-row manner. A coin transfer channel 103 extends rearward the coin introducing mechanism 102, for transferring the coins introduced by the coin introducing mechanism 102. Along the coin transfer channel 103, there are installed the coin identifying sensor 101 for identifying a denomination of each coin, and a coin ejecting part 109 for ejecting a reject coin which is described later.

Below the coin ejecting part 109, an inside storage box 104 for storing therein reject coins ejected from the ejecting part 109 is detachably attached to the housing 110. The coin change dispenser 1A has an attachment/detachment sensor S for detecting whether the inside storage box 104 is attached to the housing 110 or detached therefrom.

A denomination sorting part 105 for sorting coins by denomination is disposed downstream the coin transfer channel 103. The coin change dispenser 1A also has the coin storage part 106 for storing therein coins by denomination after the coins are sorted by the denomination sorting part 105, and a coin taking-out mechanism 108 for selectively taking (picking) out coins stored in the coin storage part 106. Coins taken (picked out) by the coin taking-out mechanism 108 are dispensed through the coin dispensing port 116. Coins collected from the coin storage part 106 are similarly dispensed through the dispensing port 116.

The introducing mechanism 102, the ejecting part 109, the sorting part 105, the storage part 106, and the taking-out mechanism 108 may have well-known or publicly-known structures, and thus their detailed description is omitted.

(3) Note Change Dispenser

The note change dispenser 1B shown in FIG. 1 includes a housing 210, and a circular revolving transfer channel 203a disposed in substantially a center part of the housing 210. In the housing 210, a note introducing unit 202, note storage parts 206, a note dispensing unit 208, a reject part 204 for reject notes to be dispensed, and a note collecting cassette 207 are disposed so as to surround an outer circumference of the revolving transfer channel 203a.

Connecting transfer channels 203b for transferring notes are formed to connect the revolving transfer channel 203a to the introducing unit 202, each of the storage parts 206, the dispensing unit 208, the reject part 204, and the collecting cassette 207, respectively. A note identifying sensor 201 is disposed on the right-side of the revolving transfer channel 203a, for identifying a denomination of notes passing therethrough. A path selecting mechanism (not shown) is disposed along the revolving transfer channel 203a, for switching a path through which notes are transferred between the connecting transfer channels 203b and the revolving transfer channel 203a.

As shown in FIGS. 1 and 2, the housing 210 has on its front surface the note receiving slot 214 corresponding to the introducing unit 202, and the note dispensing slot 216 corresponding to the dispensing unit 208. The collecting cassette 207 is detachably attached to the housing 210. The housing 210 is provided with the operation/display part 212 (FIG. 2) on a front part of its upper surface.

In FIG. 1, a function of the introducing unit 202 is to introduce thereinto note(s) inserted through the note receiving slot 214 so as to feed the received notes to the revolving transfer channel 203 (one by one). The note storage parts 206 are for storing therein the received notes, depending on respective denominations thereof which is identified by the note identifying sensor 201. There are generally three note storage parts 206 for respectively storing therein 1,000-yen notes, 2,000-yen/5,000-yen notes (mix), and 10,000-yen notes. The dispensing unit 208 dispenses notes picked out from the respective storing parts 206 through the note dispensing slot 216, so that an operator can draw the notes out of the note change dispenser 1B.

The reject part 204 stores therein the below-described "reject notes to be dispensed". The collecting cassette 207 stores therein notes collected from the respective storage parts 206. The collecting cassette 207 is also used for storing the below-described "overflow note". The dispensing unit 208 also serves as another reject part for reject received notes in which the below-described "reject deposited-note" is dispensed.

The introducing unit 202, the respective storage parts 206, the dispensing unit 208, the reject part 204, and the collecting cassette 207 may have well-known or publicly-known structures, and thus their detailed description is omitted.

[Operation]

Hereinbelow, a basic operation common to the change dispensing mode and the money exchange mode, and a specific operation (concrete examples are shown) of the money exchange mode in the coin change dispenser 1A and the note change dispenser 1B will be described.

(1) Basic Operation of Coin Change Dispenser (1-1) Money Receiving/Rejecting Operation In FIG. 1, coins deposited through the receiving port 114 are introduced by the introducing mechanism 102 in a non-stacked, single-row manner. The introduced coins (received coins) are transferred along the coin transfer channel 103. In the course of being transferred, a denomination of each coin is identified by the identifying sensor 101.

When there is a coin of which denomination cannot be identified, the coin is ejected as a "reject coin" through the coin ejecting part 109 so as to be stored in the inside storage box 104. When a denomination of a received coin is identified, but the coin storage part 106 corresponding thereto is full, the coin is ejected as an "overflow coin" through the coin ejecting part 109 so as to be stored in the inside storage box 104. In some cases, coins ejected from the coin ejecting part 109 may be returned through the coin dispensing port 116.

Other received coins are sorted by the denomination sorting part 105, and are stored in the coin storage part 106 depending on denominations of the coins. During this sorting step, the number of the deposited coins is counted by a counting sensor (not shown) disposed on the sorting part 105, so that a sum total of the deposited coins can be calculated.

(1-2) Money Dispensing/Collecting Operation

In the coin change dispenser 1A, coins to be dispensed are selectively taken out by the taking-out mechanism 108 from the coin storage part 106 in which coins are stored in accordance with denominations thereof. The taken-out coins are dispensed through the dispensing port 116.

In addition, upon the close of business, for example, when all the coins stored in the storage part 106 or coins whose sum total corresponds to sales proceeds of the day are required to be drawn out from the coin change dispenser 1A, it is possible to take out these coins from the storage part 106 by the taking-out mechanism 108 so as to dispense the coins through the dispensing port 116.

(2) Basic Operation of Note Change Dispenser (2-1) Money Receiving Operation

In FIG. 1, notes inserted thorough the receiving slot 214 are introduced and fed to the revolving transfer channel 203a one by one, by the introducing unit 202 through the connecting transfer channel 203b. Each of the notes (received notes) fed into the revolving transfer channel 203a is transferred counterclockwise along the revolving transfer channel 203a. While each of the notes moves along the revolving transfer channel 203a for one revolution, the denominations thereof is identified by the identifying sensor 201, and then each of the notes is stored depending on the denominations thereof in the corresponding storage parts 206.

(2-2) Money Dispensing Operation

In accordance with a sum total of notes to be dispensed, the note change dispenser 1B dispenses notes in manners as explained below.

(2-2-1) To Dispense a Sum Total of 3,000 yen (1,000 yen)

Three 1,000-yen notes are picked out from the storage part 206 for storing 1,000-yen notes, and are introduced one by one into the revolving transfer channel 203a through the connecting transfer channel 203b. Each of the notes introduced into the revolving transfer channel 203a is transferred clockwise along the revolving transfer channel 203a. Thereafter, each of the notes is sent to the note dispensing unit 208, without the denomination thereof being identified by the identifying sensor 201. Upon receipt of the three 1,000-yen notes, the dispensing unit 208 dispenses the notes in a bundle through the dispensing slot 216 by projecting the same to the outside. Similarly, one 1,000-yen note picked out from the storage part 206 for storing 1,000-yen notes is introduced into the revolving transfer channel 203a through the connecting transfer channel 203b. The note introduced into the revolving transfer channel 203a is transferred clockwise along the revolving transfer channel 203a. Thereafter, the note is sent to the note dispensing unit 208, without the denomination thereof being identified by the identifying sensor 201. Upon receipt of the 1,000-yen note, the dispensing unit 208 dispenses the note through the dispensing slot 216 by projecting the same to the outside.

(2-2-2) To Dispense a Sum Total of 7,000 yen

At first, a note is picked out from the storage part 206 for storing 2,000-yen/5,000-yen notes, and is transferred clockwise along the revolving transfer channel 203*a*. A denomination of the note is identified by the identifying sensor 201 while the note moves along the revolving transfer channel 203*a* for one or more revolutions. Then, the note is sent to the dispensing unit 208 in a similar manner described in the above item (2-2-1).

When the firstly picked-out note is a 5,000-yen note, two 1,000-yen notes as the rest amount of 2,000 yen are picked out from the storage part 206 for storing 1,000-yen notes. Then, in a similar manner as described in the above item (2-2-1), the two 1,000-yen notes are sent to the note dispensing unit 208, without the denomination thereof being identified.

On the other hand, when the firstly picked-out note is a 2,000-yen note, a second note is picked out from the storage part 206 for storing 2,000-yen/5,000 yen notes, and a denomination thereof is identified while the note moves along the revolving transfer channel 203*a*. When the second note is a 5,000-yen note, the 5,000-yen note is sent to the dispensing unit 208, so that a money dispensing operation is completed. When the second note is a 2,000-yen note, the 2,000-yen note is sent to the dispensing unit 208, and subsequently, three 1,000-yen notes are picked out from the storing part 206 for storing 1,000-yen notes as the rest amount of 3,000 yen. Then, the three 1,000-yen notes are sent to the dispensing unit 208, without the denomination thereof being identified.

All the notes sent to the dispensing unit 208 are dispensed outside through the dispensing slot 216 in a similar manner as described in the above item (2-2-1).

(2-3) Collecting Operation

For example, upon the close of business, when all the notes stored in the storage parts 206 or notes whose sum total corresponds to sales proceeds of the day are required to be drawn out from the note change dispenser 1B, it is possible to take out notes from the storing parts 206 and sequentially transfer the taken-out notes along the revolving transfer channel 203 so as to place the notes in the note collecting cassette 207 through the connecting transfer channels 203*b*. In a case where a note is received in the note change dispenser 1B, but the storing part corresponding thereto is full, the received note is sent to the collecting cassette 207 as an "overflow note" from the revolving transfer channel 203*a* through the connecting transfer channel 203*b*.

(2-4) Rejecting Operation

Out of the received notes, when there is a note of which denomination cannot be identified by the identifying sensor 201 because it is damaged or the like, the note is sent to the note dispensing unit 208 as a "reject received-note" from the revolving transfer channel 203*a* through the connecting transfer channel 203*b*. On the other hand, out of the notes picked out from the storing part 206, when there is a note of which denomination cannot be identified by the identifying sensor 201 because the note is transferred obliquely or the like, the note is sent to the reject part 204 as a "reject note to be dispensed" from the revolving transfer channel 203*a* through the connecting transfer channel 203*b*.

(3) Operation in Money Exchange Mode

The coin change dispenser 1A and the note change dispenser 1B execute, in the "money exchange mode", either (a) normal money exchange process or (b) reverse money exchange process. In the money exchange mode, the basic operations are the same as those described in the above items (1) and (2). Thus, combinations of received coins and notes and combinations of exchanged coins and notes in the normal money exchange mode and the reverse money exchange mode are illustrated.

(3-1) Example of Normal Money Exchange Process (Receiving a Single Piece of Money)

| Received Money × Number of Pieces | → | Combination of Exchanged Money × number of pieces |
|---|---|---|
| 500-yen coin × 1 | → | 100-yen coin × 5 |
| 1,000-yen note × 1 | → | 100-yen coin × 10 |
| 5,000-yen note × 1 | → | 1,000-yen note × 5 |
| 10,000-yen note × 1 | → | 5,000-yen note × 1 + 1,000-yen note × 5 |

(3-2) Example of Reverse Money Exchange Process (Receiving a Plurality of Pieces of Money)

| Received Money × Number of Pieces | → | Combination of Exchanged Money × Number of Pieces (minimum) |
|---|---|---|
| 100-yen coin × 5 | → | 500-yen coin × 1 |
| 100-yen coin × 10 | → | 1,000-yen note × 1 |
| 100-yen coin × 15 | → | 1,000-yen note × 1 + 500-yen coin × 1 |
| 1,000-yen note × 15 | → | 10,000-yen note × 1 + 5,000-yen note × 1 |
| *100-yen coin × 4 | → | 100-yen coin × 4 (return) |

[Effects]

Effects of the money processing system as constituted above will be described below.

According to the money processing system in this embodiment, when the money processing system is operated in the money exchange mode, the normal money exchange process and the reverse money exchange process can be automatically selected in accordance with the number of received money (coins and/or notes), without selecting a normal/reverse exchange mode. Therefore, a constitution of the money processing system for executing both the normal money exchange process and the reverse money exchange process can be simplified, and a cost required for the system can be reduced. Further, a user-friendliness of the system can be enhanced.

In particular, according to the money processing system in this embodiment, it is possible to solve problems involved in the normal money exchange process and the reverse money exchange process carried out by change dispensers (the coin change dispenser 1A and the note change dispenser 1B) in the money processing system. That is, problems such as a complicated constitution of the system, an increased cost for the system, and an inconvenience for a user can be alleviated or eliminated.

In the reverse money exchange process, a combination of the minimum number of pieces of the exchanged money is dispensed. Accordingly, the money processing system can provide a rapid reverse money exchange process, which is convenient for a user.

[Alternative Examples]

(1) In the above embodiment, although the money processing system includes, as shown in FIG. 1, the coin change dispenser 1A, the note change dispenser 1B, and the control terminal T, the present invention is not limited thereto. For example, the control terminal T may be omitted. By operating a combination of the coin change dispenser 1A and the note change dispenser 1B only in the money exchange mode, the money processing system can be used as a money exchange system. In this case, by omitting the instruction means for giving a money exchange instruction, the coin change dispenser 1A and the note change dispenser 1B may be used as machines exclusively used for a money exchange.

(2) In the above embodiment, the coin change dispenser 1A and the note change dispenser 1B are separately formed. However, by uniting the coin change dispenser 1A and the note change dispenser 1B so as to form a unitary money change dispenser having a money exchange function, or a unitary machine exclusively used for a money exchange. Alternatively, only one of the coin change dispenser 1A and the note change dispenser 1B is used as a coin or note change dispenser having a money exchange function, or as a machine exclusively for a money exchange.

(3) In the reverse money exchange process, the received money of a single denomination is illustrated. However, the money processing system according to the present invention can handle received money of more than one denominations. For example, one 5,000-yen note together with five 1,000-yen notes can be reversely exchanged into one 10,000-yen note.

What is claimed is:

1. A money processing system, comprising:
   a money receiving part for receiving money;
   a money identifying unit for identifying a denomination of the money received by the money receiving part;
   a money storage part for storing the received money, depending on a denomination thereof identified by the money identifying unit;
   a money dispensing part for dispensing the money stored in the money storage part; and
   a control unit for carrying out a procedure in which the money stored in the money storage part is picked out in accordance with a given dispensing condition, and the picked-out money is dispensed from the money dispensing part; wherein
   the control unit is adapted to carry out a money exchange mode control for executing one process automatically selected from (a) a normal money exchange process and (b) a reverse money exchange process based on a determination of whether a single piece of money or a plurality of pieces of money are received,
   wherein
   (a) the normal money exchange process is a process for dispensing a combination of exchanged money each having a denomination smaller than that of the received money, such that a sum total of the combination of the exchanged money is equivalent to the received money, and
   (b) the reverse money exchange process is a process for dispensing a combination of exchanged money each having a denomination larger than that of the received money, such that a sum total of the combination of the exchanged money is equivalent to the received money.

2. The money processing system according to claim 1, wherein
   the control unit is adapted to dispense a combination of the minimum number of pieces of the exchanged money in (b) the reverse money exchange process.

3. The money processing system according to claim 1, wherein
   the system further comprises instruction parts for giving a money exchange instruction to the control unit, and
   the control unit is generally adapted to carry out a change dispensing mode control for receiving money given by a customer and dispensing change as occasion demands, and is adapted to carry out the money exchange mode control when the money exchange instruction is given from the instruction parts.

4. The money processing system according to claim 3, wherein
   the control unit is adapted to dispense a combination of the minimum number of pieces of the exchanged money in the (b) reverse money exchange process.

* * * * *